Aug. 22, 1961     E. J. DUNHAM     2,997,193
DEVICE FOR MATERIALS HANDLING VEHICLES
Filed Oct. 30, 1957     2 Sheets-Sheet 1
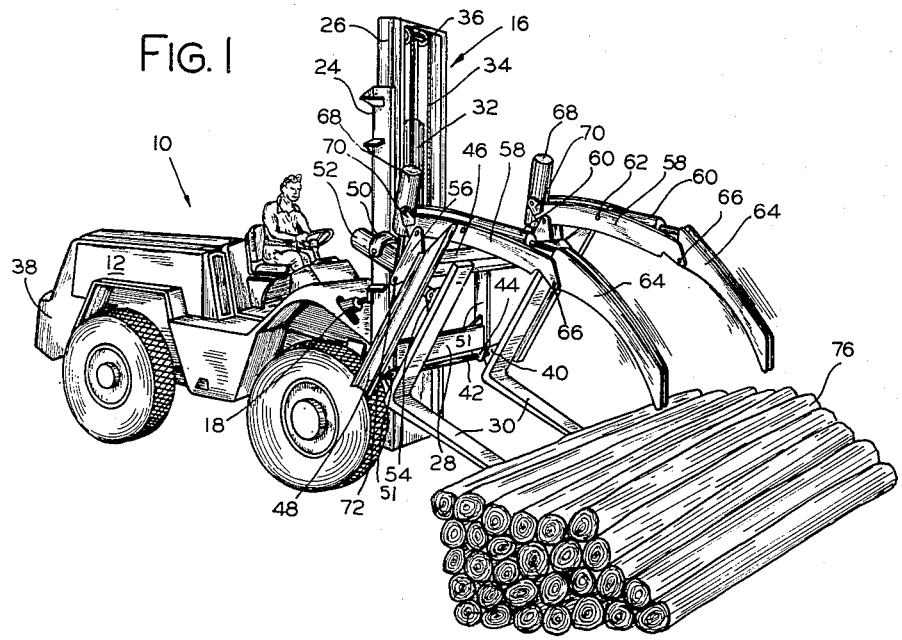
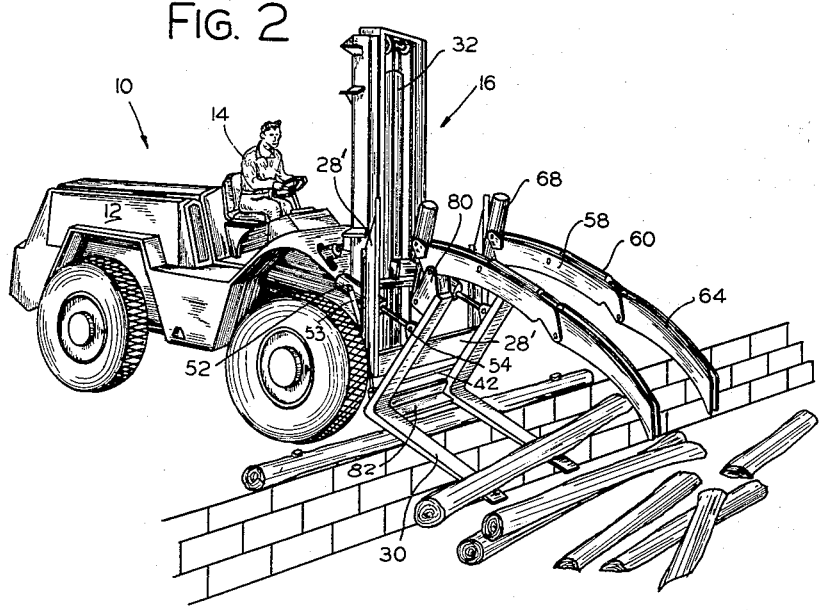
INVENTOR.
ELMER J. DUNHAM
BY J. Frederick Bechtel
ATTY.

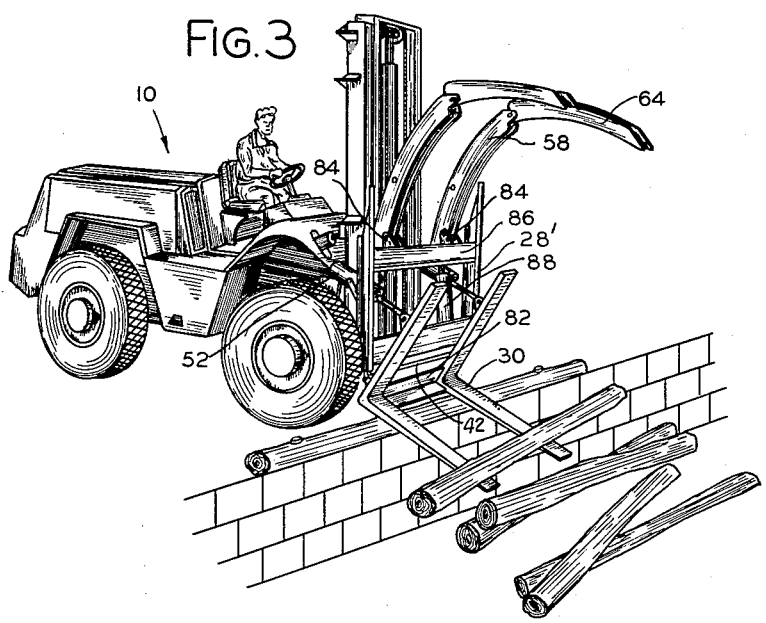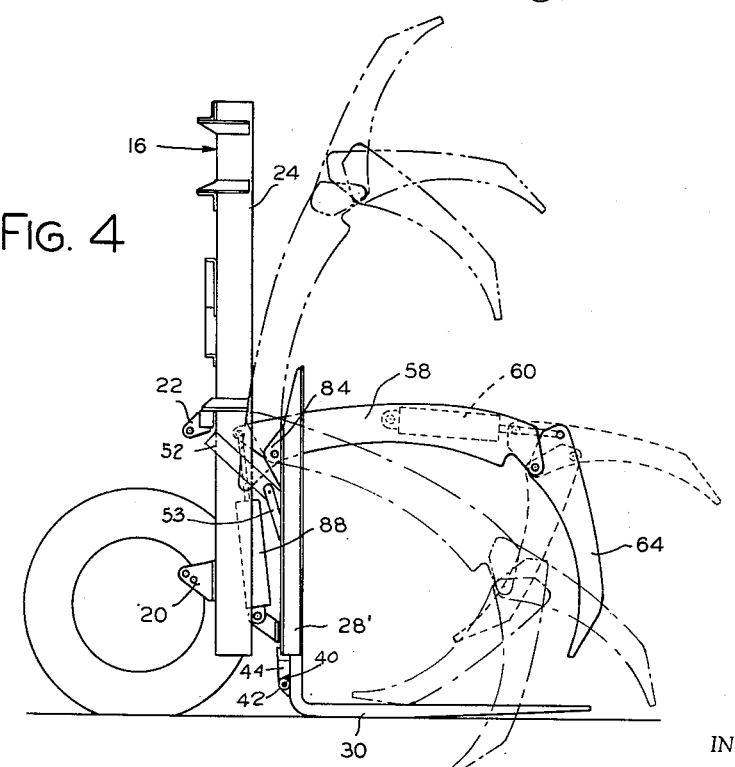

United States Patent Office 2,997,193
Patented Aug. 22, 1961

2,997,193
DEVICE FOR MATERIALS HANDLING VEHICLES
Elmer J. Dunham, Battle Creek, Mich., assignor to Clark Equipment Company, a corporation of Michigan
Filed Oct. 30, 1957, Ser. No. 693,485
9 Claims. (Cl. 214—654)

The invention relates to an attachment for a materials handling vehicle, and more particularly to a materials loading, unloading and hold-down device for such vehicles, such as might be used for handling logs.

Attachments have previously been provided for vehicles of the type contemplated wherein a tiltable load engaging means, which may include fork tines, is mounted adjacent one end of the vehicle for loading, transporting and disengaging loads, which load engaging means includes a pivoted hold-down arm mechanism for retaining a load on the fork tines, or for permitting disengagement of a load therefrom, as desired. Prior hold-down devices of the general type contemplated have consistently failed to provide both means for piecemeal engagement and disengagement of a bulk load, such as logs, and a sufficiently wide range and type of movement of the hold-down device to afford maximum utilization of a vehicle having such a device associated therewith.

I have found that by providing a unique combination of pivoted arms and actuators therefor in a hold-down device, and then combining said device with tiltable load engaging means, such as the fork tines of a lift truck, that the loader mechanism or attachment becomes inherently capable of performing load handling operations not possible with prior mechanisms of the general type contemplated.

It is therefore a primary object of my invention to provide in a loader mechanism of the type contemplated a hold-down device associated with load engaging means of the mechanism for performing multiple operations on a load, including the selecting of given units only of a bulk load of discrete articles for engagement by or disengagement from the load engaging means of the mechanism.

Another object of this invention is to provide a highly efficient, versatile and relatively low cost loader attachment for materials handling vehicles.

A further object of this invention is to generally improve on the construction and capabilities of attachments of the type contemplated.

Other objects and advantages of this invention will be apparent to persons skilled in the art following the detailed disclosure of three embodiments thereof which follows:

In the drawings:
FIGURES 1, 2 and 3 are perspective views of three different embodiments of my invention, each embodiment being associated with an industrial lift truck; and
FIGURE 4 is an enlarged side view in elevation of my invention as embodied in FIGURE 3 and wherein the hold-down device is illustrated in a plurality of positions of operation.

Referring now to the figures, and first to FIGURES 1, 2 3, there is illustrated generally at numeral 10 an industrial lift truck of the outdoor type which is capable of operation over rough terrain. This vehicle includes a body portion 12 which is mounted on fore and aft pairs of drive wheels, the rear wheels being also utilized as the steering wheels of the truck. An operator is represented at numeral 14 in an operator's compartment in the forward portion of the truck wherein are provided a plurality of truck controls, not shown, for operating the truck, the lifting mechanism, and loader mechanism to be described.

At the forward end of the body portion of the truck is located a vertically disposed telescopic mast structure indicated generally by the numeral 16. The mast structure 24 includes an outer guideway formed by a pair of channel members 16 and an inner slide member 26 which telescopes within the outer guide structure 24. This mast is pivotally mounted in known manner adjacent its lower end on the body portion of the truck, and is arranged to be tilted forwardly and rearwardly by conventional hydraulic tilt motor means, one of which motor means is shown at numeral 18. Each motor means comprises a cylinder and piston assembly which is connected between one side of the mast structure 24 and the body of the truck.

In FIGURE 4 the bracket 20 schematically represents a bracket secured to the rear of the mast structure 16 and adapted to be pivotally connected to the lower-forward portion of the truck body for permitting tilting movement of the mast structure forwardly and rearwardly upon energization of the tilt motor means; the piston rod of each motor means may be connected to one side of the mast structure by a bracket 22.

A load supporting carriage variously shown at numerals 28 and 28' in the figures is arranged to be moved upwardly and downwardly on the inner slide member 26. A pair of forwardly projecting fork tines or load engaging means 30 are mounted upon the various carriages 28 and 28' for independent tilting movement relative to the mast structure in a manner to be described.

Vertical movement of the fork tines and carriage is produced in a conventional manner by an hydraulic hoist motor 32 comprising an outer cylinder and an inner piston which is arranged to raise and lower the carriage 28 and the fork tines 30 through a chain and sprocket mechanism of well known construction, said mechanism being shown generally at numerals 34 and 36. Bracket and roller means, not shown, of known construction connect the carriage 28 to the track of the inner slide member 26.

The truck 10 also includes at the rear end thereof a counter-weight 28 which ordinarily is made of metal and is secured to the rear end of the truck to counterbalance loads which are carried on the fork tines at the front of the truck.

Referring now particularly to FIGURE 1, bracket means 40 are secured adjacent the lower portion of the vertical leg portion of each fork tine 30, which brackets are mounted for pivoting movement upon a rod 42 which is supported by a pair of laterally spaced depending ears 44 of the carriage 28, the carriage comprising a frame of generally rectangular construction. The uppermost portion of each fork tine is secured to a transverse bar 46, to the opposite ends of which are connected downwardly depending members 48 which are pivotally connected to the opposite ends of rod 42 for tilting movement with the fork tines relative to the carriage.

A pair of laterally spaced bracket members, one of which is shown at numeral 50, is secured, as by welding, to the upper portions of a pair of vertical side members 51 of the carriage 28; each bracket member forms a U-shaped yoke in which is pivotally supported hydraulic cylinder and piston assembly 52, the piston rod of each said assembly being pivotally connected to the vertical leg portion of one of fork tines 30 by means of a bracket member, one of which is shown at numeral 54.

Fixedly secured to the upper portion of the rear edge of each vertical member 48 is a generally triangular-shaped pair of brackets 56 between which is pivotally connected in the upper portion a forwardly extending arm 58. Each arm 58 is comprised of an elongated U-shaped member, in the pocket of which is mounted an hydraulic cylinder and piston assembly 60 which is pivotally connected to the legs of one of the members 58 at the rear cylinder portion thereof by pin means 62 and to one of a pair of laterally spaced articulated arm members 64 (also of generally elongated U-shaped construction) at the rod end thereof. The arm members 64 are also pivotally connected to the forward ends of respective arm members 58 by pins 66. The arms 58 may be located in any desired angular relation to fork tines 30 by means of a pair of laterally spaced hydraulic cylinder and piston assemblies 68, each of which is pivotally connected at the cylinder end to a bracket portion 70 at the rear end of one of the arms 58 and at the rod end to the lower portion of one of the brackets 56 by a pin 72.

It will now be seen that the loader attachment shown in FIGURE 1, which comprises generally the fork tines 30 and semi-independent pairs of arms 58 and 64 (each of which pairs is separately pivotable relative to the other and also to the fork tines), may be independently pivoted relative to the mast structure 16 about rod 42, or may be pivoted with the mast structure about brackets 20 upon energization of tilt cylinders 18, or may be pivoted about rod 42 simultaneously with pivoting of the mast structure on brackets 20. Hydraulic valve control means, not shown, is adapted to energize each of the cylinders separately from the other cylinders, or to simultaneously energize all of the cylinders together, as desired. Each of the cylinder assemblies is double acting, whereby positive movement thereof in either direction is available.

In operation, the loader mechanism of FIGURE 1 may be moved to a position adjacent a load of logs 76, for example, by vehicle 10, whereupon the fork tines 30 may be utilized in the normal manner to scoop up the load of logs, or may be tilted forwardly to a desired angle by cylinder assemblies 50 to engage a portion only of the logs above one or more of the lower layers thereof by digging in through the pile.

The pairs of articulated arm members 58 and 64 may be individually or simultaneously operated as desired by the pairs of cylinder assemblies 60 and 68 to engage all or any desired portion of the logs 76. For example, if a portion only of the logs 76 are desired to be loaded upon the fork tines 30 the arm portions 58 may be actuated to a desired angular position relative to the fork tines, whereupon the arms 64 may be arcuately reciprocated by alternate reversing action of cylinder assemblies 60 to, in effect, roll selected logs or groups of logs onto the fork tines for subsequent transport by the truck. The available reciprocating arcuate motion of arm members 64 may also be utilized to dislodge or unload a portion only of a given load of logs being carried on the fork tines.

FIGURE 2 illustrates a somewhat modified form of the invention as shown in FIGURE 1 wherein similar parts have been numbered similarly to corresponding parts shown in FIGURE 1.

In FIGURE 2, the fork tines 30 are also pivoted about bracket and rod means located adjacent the bottom of carriage 28' and similar to such means as illustrated at numerals 40, 42 and 44 in FIGURE 1. Hydraulic fork tilt cylinder assemblies 52 are pivoted approximately centrally of the carriage by bracket means 53 and are pivotally connected to the vertical legs of the fork tines at 54. Bracket members 80 are secured to the upper portions of the legs of the fork tines, the arm members 58 and cylinder assemblies 68 being connected to said bracket members and to each other in the manner of the construction in FIGURE 1. In FIGURES 2 and 3 of the drawings the heel portions of fork tines 30 are connected by a transverse angle member 82, which adds rigidity to the structure.

The operation of the loader assembly shown in FIGURE 2 is essentially the same as that disclosed in FIGURE 1, only relatively minor modifications having been made in the construction thereof.

In the embodiment of FIGURE 3 the articulated arm assemblies 58, 64 are not attached to the upper portions of the tiltable fork tine construction, but are pivotally connected by laterally spaced brackets 84 to the upper transverse frame member 86 of carriage 28', whereby the forks are pivotable relative to the carriage 28' and independently of the articulated arm assemblies by bracket and rod means such as previously described at numerals 40, 42 and 44.

A pair of laterally spaced hydraulic cylinder and piston assemblies, one of which is shown at numeral 88, is pivotally connected between the lower transverse frame member of carriage 28' and the rear portion of each arm member 58 for pivoting said arm members relative to the carriage and the fork tines. It will be noted that the cylinder assemblies 88 are not in as exposed a position as the corresponding cylinders 68 in FIGURES 1 and 2.

FIGURE 4 illustrates particularly well some of the various combinations of positions which my articulated arm construction can assume. For purposes of illustration, the somewhat more simplified embodiment of FIGURE 3 has been shown as regards constructional details. The essentials of the invention are, of course, well illustrated in any one of the three embodiments herein disclosed. As will be apparent from a consideration of FIGURE 4, my loader mechanism is adapted to efficiently load, unload and hold in fixed position for transport a wide variety of sizes and shapes of loads. It is particularly well adapted for use in loading and handling such articles as logs. Also, as hereinbefore described, the articulated arm construction 58, 64 and cylinder assemblies associated therewith are operable to select discrete units from a large number thereof for loading same on or unloading same from the fork tines. The latter operation can be effected by utilizing the available reversible fingering action of pivoted arms 64.

Although but three embodiments of this invention have been herein described in detail, it will be understood by persons skilled in the art that many modifications in the construction, form and arrangement of parts may be made without departing from the scope of this invention.

I claim:

1. In an industrial truck having a vertical mast assembly secured adjacent one end thereof, a material handling attachment connected to the mast assembly comprising forwardly extending load engaging means mounted for pivotal movement relatively closely adjacent the mast assembly, a vertical hoist motor in the mast assembly connected to the attachment for actuating it vertically along the mast, motor means for pivoting said load engaging means relative to the mast assembly, and a forwardly extending articulated arm construction operably associated with the load engaging means and including a first forwardly extending arm means pivotally secured to a portion of the load engaging means, a generally vertically extending piston-cylinder reversible motor means for actuating said first arm means pivotally in a vertical plane, the piston rod and cylinder elements of the motor means being connected to and between a rearwardly extending portion of the first arm means and a rearwardly extending portion of the load engaging means, second arm means pivotally connected to the first arm means adjacent one end thereof, and reversible motor means connected between the first and second arm means for actuating the second arm means independently of the first arm means and in the plane of the first arm means.

2. In an attachment for material handling vehicles, a load engaging means actuatable upwardly and downwardly in a vertical plane and adapted to be lowered to ground level for moving under and engaging a load, an articulated arm means mounted on said load engaging means adjacent an upper portion thereof and actuable upwardly and downwardly in a vertical plane with said load engaging means for holding a load on said load engaging means, including first arm means pivotally connected adjacent the rear portion thereof to the load engaging means, a generally vertically extending piston-cylinder reversible motor means for actuating said first arm means pivotally in a vertical plane, the piston rod and cylinder elements of the motor means being connected to and between a rearwardly extending portion of the first arm means and a rearwardly extending portion of the load engaging means, a second arm means pivotally connected to the forward portion of the first arm means and extending forwardly thereof, said first and second arm means each comprising a pair of closely laterally spaced members, and a second generally forwardly extending reversible motor means for actuating said second arm means pivotally in a vertical plane relative to and independently of the first arm means, said second motor means being nested in the space between said laterally spaced members of the first and second arm means and connected at one end to the first arm means and at the opposite end to the second arm means for actuating the second arm means about its pivotal connection to the first arm means independently of pivotal movement of the first arm means about its pivotal connection to the load engaging means.

3. In a material handling vehicle having an upright mast assembly at one end thereof, an attachment connected to the mast assembly for vertical movement therein comprising forwardly extending load engaging means mounted for pivotal movement relative to the mast assembly and operable to engage and lift a load from ground level, motor means for pivoting said load engaging means relative to the mast assembly, a pair of laterally spaced first elongated pivoted arm means extending forwardly of the vehicle and generally above the load engaging means, reversible motor means for actuating said first arm means pivotally in a vertical plane, a pair of laterally spaced second elongated arm means extending forwardly of the first arm means and pivotally connected adjacent the forward end of the first arm means, each element of each pair of said first and second arm means comprising a pair of laterally spaced members, and reversible motor means for actuating said second arm means pivotally in a vertical plane relative to and independently of the first arm means, said latter motor means being nested between cooperating pairs of said laterally spaced members and connected at one end to each of the first arm means and at the opposite end to each of the second arm means, respectively, whereby said first and second arm means together provide an articulated arm construction operable to assist the load engaging means in loading thereon and unloading therefrom discrete units of a load.

4. In an industrial lift truck having a vertical mast assembly secured adjacent one end thereof, a material handling attachment connected to the mast assembly comprising a pair of forwardly extending fork tines mounted for pivotal movement relatively closely adjacent the mast assembly, first motor means extending vertically of the mast assembly and operatively connected to the attachment for actuating it vertically along the mast, second motor means connected to the load engaging means for pivoting same forwardly of the vertical mast assembly to a discharging position, a first pair of arm members pivotally connected adjacent the upper ends of the fork tines and extending forwardly thereof, third motor means pivotally connected between the rearward portions of the arm members and fork tines for actuating the arm members in a vertical plane, a second pair of forwardly projecting arm members pivotally connected to the forward portions of the first pair of arm members, and fourth motor means connected between said first and second pairs of arm members for selectively and independently pivoting said second pair of arm members relative to said first pair of arm members, said first and second pairs of arm members and said pivotable fork tines being operable together to load and unload discrete units of a load.

5. An attachment as claimed in claim 2 plus means pivotally connecting the load engaging means to the vehicle for pivotal movement in a vertical plane, and actuating means connected to the load engaging means for selectively controlling pivoting movement thereof about said latter pivot means.

6. An attachment as claimed in claim 3 wherein carriage means are provided for supporting the load engaging means and said first arm means is pivotally connected adjacent the rear end thereof to an upper portion of the carriage means.

7. An attachment as claimed in claim 3 wherein said attachment includes carriage means, means pivotally connecting the load engaging means to the carriage means, said first mentioned motor means including a reversible motor for pivotably actuating said load engaging means relative to the carriage means, and means connecting said pair of first arm means to a portion of the load engaging means such that said first and second arm means are also pivotable in a vertical plane with said load engaging means.

8. An attachment as claimed in claim 3 wherein said attachment includes carriage means, means pivotally connected the load engaging means to the carriage means, said first mentioned motor means including a reversible motor for pivotably actuating said load engaging means relative to the carriage means, and means pivotably connecting said first arm means to the carriage means such that said load engaging means is pivotable independently of said first and second arm means.

9. In a loader, the combination with a materials handling vehicle of a vertically movable load carrying support mounted adjacent one end of the vehicle, a pair of fork tines tiltably mounted on the front portion of the support and movable from a load receiving position to a discharging position, a pair of laterally spaced, elongated and forwardly extending arm members pivotally connected to the load support and extending forwardly and above the fork tines, a second pair of laterally spaced, elongated and forwardly projecting arm members pivotably connected adjacent the forward ends of the first said pair of arm members, and separate motor means for tilting the fork tines in a vertical plane relative to the support and for selectively and independently pivoting said first and second pairs of arm members one relative to the other in such a manner that said pairs of arm members and said fork tines are operable together to load and unload discrete units of a mass load.

References Cited in the file of this patent

UNITED STATES PATENTS

| | | |
|---|---|---|
| 2,323,605 | Johnson | July 6, 1943 |
| 2,387,656 | Gledhill | Oct. 23, 1945 |
| 2,418,251 | Drott | Apr. 1, 1947 |
| 2,583,075 | Anderson et al. | Jan. 22, 1952 |
| 2,626,722 | Talbott | Jan. 27, 1953 |
| 2,738,087 | Arnot | Mar. 13, 1956 |
| 2,776,768 | Carlson | Jan. 8, 1957 |
| 2,795,872 | Wardle | June 18, 1957 |
| 2,799,412 | Pilch | July 16, 1957 |
| 2,875,913 | Gohrke et al. | Mar. 3, 1959 |

FOREIGN PATENTS

| | | |
|---|---|---|
| 920,899 | Germany | Dec. 2, 1954 |
| 1,093,545 | France | May 5, 1955 |